(12) United States Patent
Akman

(10) Patent No.: US 11,524,915 B2  
(45) Date of Patent: Dec. 13, 2022

(54) SYSTEM USED IN DESIGN APPLICATIONS

(71) Applicant: T.C ISTANBUL MEDIPOL ÜNIVERSITESI, Istanbul (TR)

(72) Inventor: Seher Oya Akman, Istanbul (TR)

( * ) Notice: Subject to any disclaimer, the term of this patent is extended or adjusted under 35 U.S.C. 154(b) by 434 days.

(21) Appl. No.: 16/609,107

(22) PCT Filed: Apr. 14, 2018

(86) PCT No.: PCT/TR2018/050168  
§ 371 (c)(1),  
(2) Date: Oct. 28, 2019

(87) PCT Pub. No.: WO2019/032067  
PCT Pub. Date: Feb. 14, 2019

(65) Prior Publication Data  
US 2020/0189950 A1 Jun. 18, 2020

(30) Foreign Application Priority Data  
Apr. 28, 2017 (TR) .................. 2017/06349

(51) Int. Cl.
| | |
|---|---|
| *C03B 23/00* | (2006.01) |
| *C03C 19/00* | (2006.01) |
| *C03C 17/00* | (2006.01) |
| *B05D 3/04* | (2006.01) |
| *B05D 1/02* | (2006.01) |

(Continued)

(52) U.S. Cl.  
CPC ........ *C03B 23/0013* (2013.01); *B05D 3/0413* (2013.01); *C03B 23/0086* (2013.01); *C03C 17/001* (2013.01); *C03C 19/00* (2013.01); *B05D 1/002* (2013.01); *B05D 1/02* (2013.01);

(Continued)

(58) Field of Classification Search  
CPC ... C03B 23/002; C03B 23/0046; C03B 19/00; B05D 3/12; B05D 1/002  
See application file for complete search history.

(56) References Cited

U.S. PATENT DOCUMENTS

| | | | | |
|---|---|---|---|---|
| 541,851 A | * | 7/1895 | Gruhl ................. | C03B 23/0046 65/297 |
| 589,816 A | * | 9/1897 | Cleveland .......... | C03B 23/0046 65/297 |

(Continued)

FOREIGN PATENT DOCUMENTS

| | | | |
|---|---|---|---|
| CN | 103143482 A | * | 6/2013 |
| CN | 103754045 A | | 4/2014 |

(Continued)

OTHER PUBLICATIONS

International Search Report for PCT/TR2018/050168.

*Primary Examiner* — Alison L Hindenlang  
*Assistant Examiner* — Steven S Lee  
(74) *Attorney, Agent, or Firm* — Egbert, McDaniel & Swartz, PLLC

(57) ABSTRACT

A system for use in glass production technology such as for production of glass packaging, glassware, glass home equipments, wherein the system allows all kinds of design additions such as color, pattern, texture, decor, seal and form changing processes to be applied to the product without requiring re-firing of the product, after removal of the product from the moulds in the production lines while the product is still hot and the temperature is kept constant.

4 Claims, 3 Drawing Sheets

(51) Int. Cl.
*B05D 1/00* (2006.01)
*B05D 3/02* (2006.01)
*B05D 3/12* (2006.01)

(52) U.S. Cl.
CPC ............... *B05D 3/02* (2013.01); *B05D 3/12* (2013.01); *C03C 2217/00* (2013.01); *C03C 2218/112* (2013.01)

(56) References Cited

U.S. PATENT DOCUMENTS

| | | | | |
|---|---|---|---|---|
| 1,478,261 A * | 12/1923 | Sloan | .................... | C03B 23/002 65/276 |
| 1,638,620 A * | 8/1927 | Cornwell | .............. | C03B 23/002 65/355 |
| 1,649,641 A * | 11/1927 | Zeiler | ................... | C03B 23/002 65/171 |
| 1,775,965 A * | 9/1930 | Middendorf | .......... | C03B 23/002 65/276 |
| 1,849,823 A * | 3/1932 | Cornwell | .............. | C03B 23/002 65/280 |
| 2,019,736 A * | 11/1935 | Schwab | ................ | C03B 23/002 65/297 |
| 2,883,797 A * | 4/1959 | Eldred | .................... | C03B 29/06 65/272 |
| 2,888,780 A * | 6/1959 | Bode | .................... | C03B 23/0073 65/276 |
| 3,834,884 A * | 9/1974 | Kurokawa | ............ | C03B 9/1932 65/237 |
| 5,259,858 A * | 11/1993 | Inao | .................... | C03B 23/0046 65/102 |
| 6,037,012 A * | 3/2000 | Lourman | ............... | C03C 17/005 118/629 |
| 2002/0102388 A1* | 8/2002 | Burnham | .................. | B44C 1/24 65/95 |

FOREIGN PATENT DOCUMENTS

| | | | | |
|---|---|---|---|---|
| DE | 2517504 A1 | * | 7/1976 | ......... B05B 13/0235 |
| FR | 339479 A | * | 1/1904 | |
| GB | 422846 A | * | 1/1935 | |
| JP | S61168553 A | | 7/1986 | |
| JP | S61266333 A | | 11/1986 | |
| JP | 2000246151 A | * | 9/2000 | ........... C03C 17/005 |
| JP | 2014037459 A | * | 2/2014 | |
| TR | 2006/03789 A | | 7/2006 | |

* cited by examiner

SYSTEM USED IN DESIGN APPLICATIONS

TECHNICAL FIELD

The present invention relates to a system for use in glass production technology such as for production of glass packaging, glassware, and glass home equipment. The system allows all kinds of design additions such as color, pattern, texture, decor, seal and form changing processes to be applied to the product without requiring re-firing of the product, after removal of the product from the moulds in the production lines while the product is still hot and the temperature is kept constant.

PRIOR ART

Automatic glass production technology is a system in which glasses are automatically produced cooled in post-production cooling ovens, and post-cooled packaging processes are carried out. Also, such glasses can be sent to a decor section for pattern or color applications. The transmission of glass to the decor area for design applications after the production and cooling process gives rise to a second process. This second process arises from the requirement of re-firing of the glass for fixing of the decor and the dye according to their heat acceptance.

Turkish patent document TR2006/03789 mentions the production method of colored mosaic tinted glass, which is used as interior and exterior decorative facade covering material in bathrooms, kitchens, halls and pools and a production method of this mosaic. The production method described in the document includes the steps of glass cutting and beveling, first firing, first coloring, foliar application, second coloring, second firing, application of base primer, third firing, filing and packaging.

Chinese patent document CN 104513025 discloses a method for processing a decorative glass plate. In this document, the process of glass plate processing includes the steps of cutting and glazing of patterned flat glass, enameling, sand blasting, and glass firing.

The present invention discloses that the process of producing decorative glass that has bright color, and three-dimensional effect, a distinctive decorative effect, with easy and simple technology, high production efficiency.

BRIEF DESCRIPTION OF THE INVENTION

The present invention is a system for use in glass production technology, such as for production of glass packaging, glassware, and glass home equipment. The system allows all kinds of design additions such as color, pattern, texture, decor, seal and form changing processes to be applied to the product after removal of the product from the moulds in the production lines while the product is still hot and the temperature is kept constant.

Another object of the invention is to provide a system that enables the desired designs to be obtained by making all kinds of designs, colors, textures and seals on the product lines based on the temperature of the products after removal of the product from the mould and its transfer to the production line.

Another object of the invention is to provide a system in which it is possible to make design additions to each desired place on the product with the help of an adjustable color and design reservoir.

Another object of the invention is to provide a system in which changes to the product can be made and the product can be placed back into the production line.

Another object of the invention is to provide a system which can be adapted to any kind of glass production line.

BRIEF SUMMARY OF THE INVENTION

Figure 1:
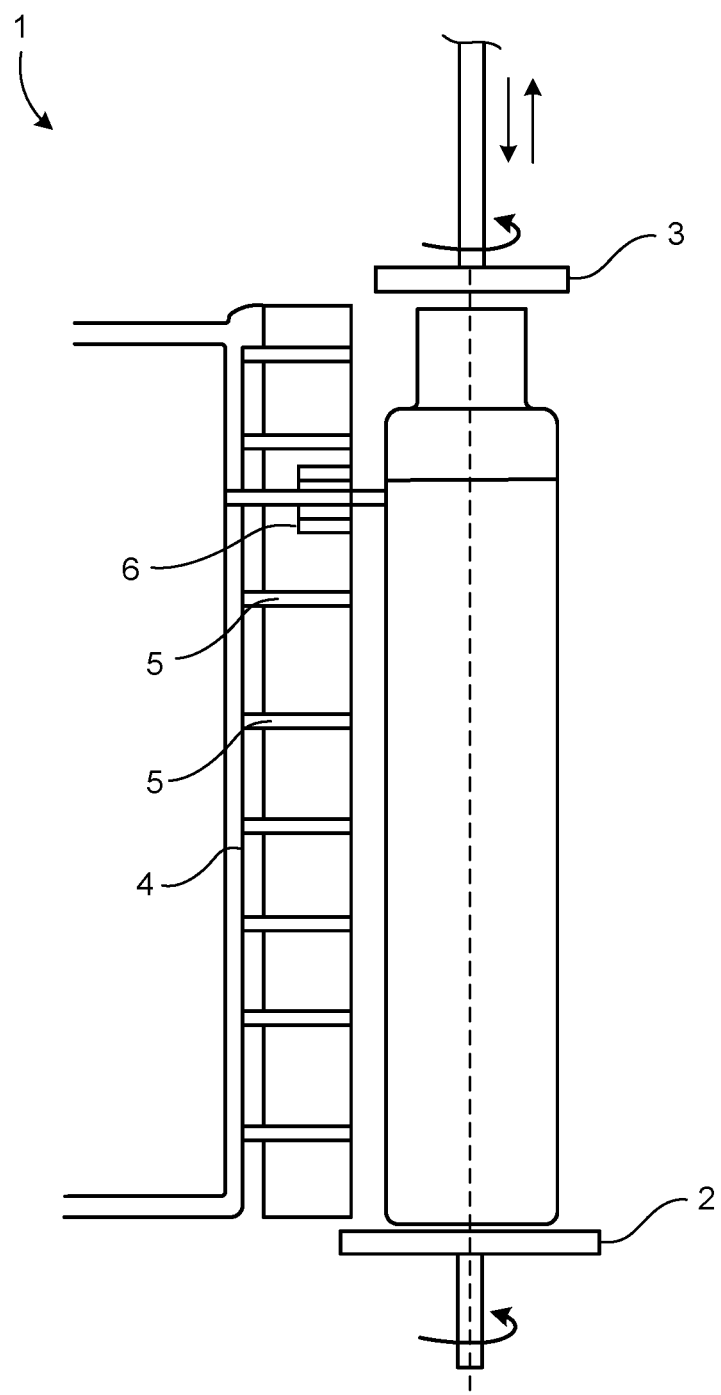
FIG. 1 shows the structure that is used to keep the product warm in the system according to the present invention.
Figure 2:
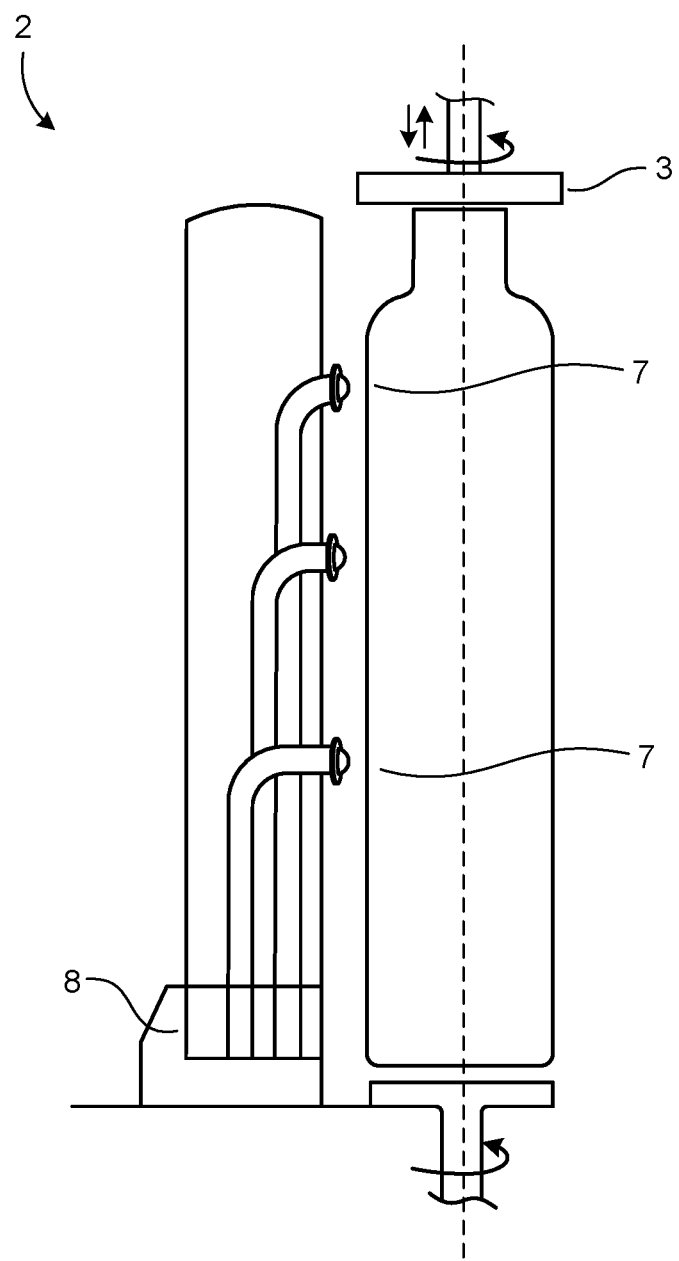
FIG. 2 shows the sprayers used for design applications to be made on the product in the system according to the present invention.
Figure 3:
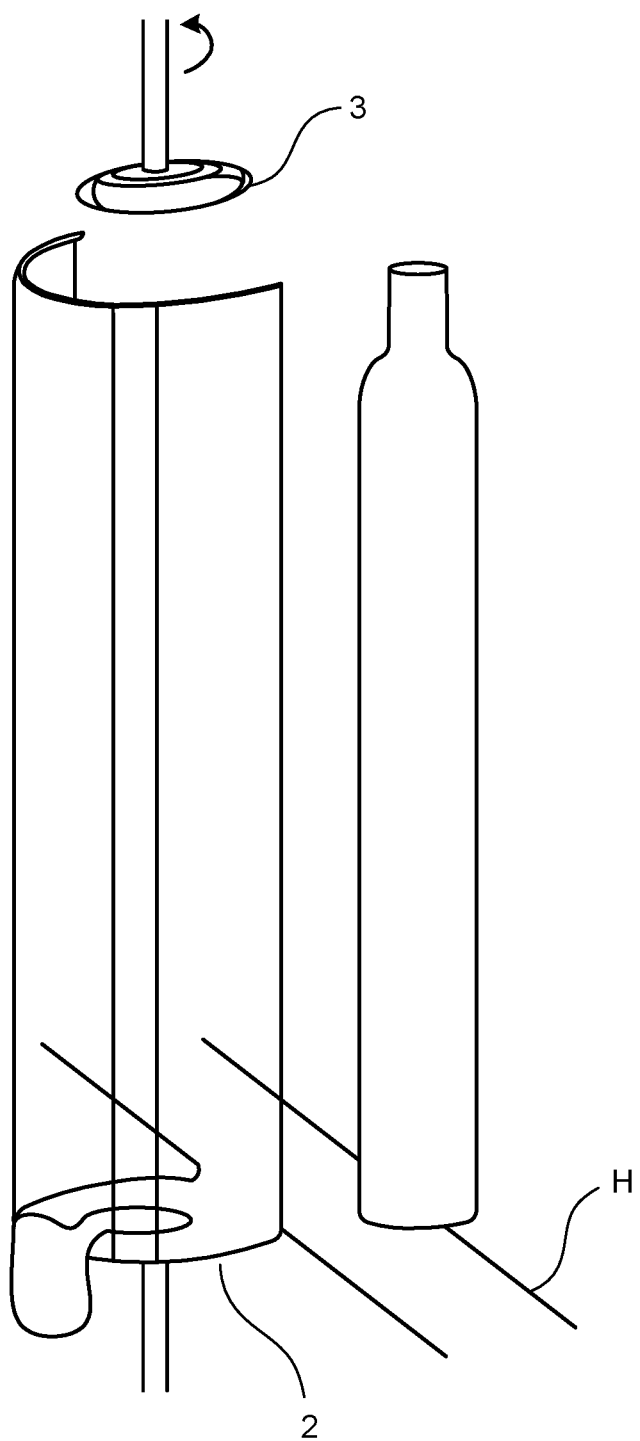
FIG. 3 shows the appearance of the product after the removal of the product from the production line for making design applications and then replacement of the product back into the production line in the system according to the present invention.

The parts in the figures are numbered individually as shown below.
1. System
2. Holder
3. Stabilizer
4. Heating element
5. Air ducts
6. Relief mold
7. Sprayer
8. Color reservoir

DETAILED DESCRIPTION OF THE INVENTION

A system (1) according to the present invention for use on a production line, for addition of design elements to hot products ejected from the glass production line comprises at least one rotatable holder (2) that is in connection with the product flow on the production line (H), for receiving the product from the line for design application and then, after design application, replacement of the product to the line (H);

at least one rotatable stabilizer (3) that stabilizes the product removed by the rotatable holder (2) by fastening the product on the rotatable holder (2);

at least one heating element (4) for keeping the product fixed by the holder (2) and the stabilizer (3) at a constant temperature;

at least one relief mold (6) located on the heating element (4), in which the relief mold (6) performs the embossing operations on the product and moves back and forth towards the product; at least one sprayer (7) which applies color and patterning on the product fixed on the holder (2) with the stabilizer (3) and on the product moving on the line (H);

one or more color reservoirs (8) connected to the sprayer (7) in which the colors required for color and pattern applications to be applied on the product with the sprayer (7) are stored; and at least one control unit (not shown in the figures) wherein the commands for design applications that will be carried on the product that is moving on the production line (H) and product removed from the production line (H) are submitted and which in accordance with these commands, the control unit arranges the holder (2), the stabilizer (3), the heating element (4), the relief mold (6), sprayer (7) and the color reservoirs (8) and thus controls the application of the desired design element on the product.

In the system (1) according to the present invention, the holder (2) is the element which takes up the hot products from the production line (H) in order to make the design applications. The holder (2) is rotatable and the product is made ready for application of the design by movement of the stabilizer (3) on the holder (2) towards the product and fixing it on the holder.

In a preferred embodiment of the system (1) according to present invention, the stabilizer (3) fixes the product through its movement towards the holder (2) when the product is on the holder (2), and releases the product for transfer to the production line (H) through its movement away from the holder (2). The stabilizer (3) moves together with the holder (2) thus allowing the design additions to be made on all surfaces of the product.

In the system (1) according to the present invention (1), the heating element (4), which is used to keep the product at a fixed or desired temperature, comprises air ducts (5) through which hot air is passed. This way, the temperature of the heating element (4) is controlled. The relief mold (6) is located on one of the air ducts (5). The relief mold (6) is able to move towards and away from the product on the heating element (4) Interior 16 of the system (1) according to the invention, the heat that is going to be applied to the product through the heating element (4) can be programmed from the control unit.

In the system (1) according to the present invention, the sprayer (7) comprises rotating nozzles that can rotate 360°. The chlorine dioxide solution generating of sprayers (7) can apply the desired colors and designs to the product as programmed from the control unit, with the help of these rotating nozzles. The nozzles of the sprayer (7) have variable tips. In a preferred embodiment of the invention, the nozzles of the sprayer (7) communicate with the color chambers (8) via channels.

In the system (1) of the present invention, the color reservoirs (8) are connected to the nozzles (7) via channels and transmit color or color mixtures to the nozzles of the sprayer (7) depending on the design application submitted to the control unit. The color reservoirs (8) are in a programmable structure. The mixing of the colors in the reservoirs (8) is also carried out.

In the system (1) of the present invention, the control unit performs the desired operation to the product on the line (H), if it is desired to make a design on a single surface of the product. If it is desired to make a design to all surfaces of the product or to a controlled area on the product, then the holder (2) and the stabilizer (3) receives the product and provides rotating motion of the product so that the design application can be made to the side or bottom surface of the product with the help of the sprayer (7) and/or relief mold (6) while the product is kept at a constant temperature with the use of the heating element (4). The system (1) further comprises a laser applicator controlled by the control unit. In this manner, laser application on the product can be carried out. The control unit also performs form/structure changes on the product.

With the system (1) according to the present invention, after removal of the product from the mold and while the product is still hot on the production line, design additions such as color, texture, design, and seal are made. As the product is proceeding on the line (H) while the product is still hot, if a design application to only one side of the product is requested, the control unit makes desired design addition to the product without disturbing the production line (H) flow. If it is desired to make a design to all surfaces of the product or to a controlled area on the product, then the holder (2) receives the product and fixes, with the stabilizer (3) and by controlling the rotating motion, keeps the product at a constant temperature with the help of the heating element (4). The control unit provides an addition of the design to desired surfaces with the relief mold (6) and/or sprayer (7) The control unit returns the product to the line (H) after the design has been made. In this way, with the system (1), it is possible to make the necessary design additions on the product without the product losing the temperature when it was ejected from the mould.

The invention claimed is:

1. A system for applying design elements to a product received from a production line, the system comprising:
   at least one rotatable holder positioned adjacent to the production line and adapted to receive the product from the production line;
   at least one rotatable stabilizer positioned in spaced parallel relationship to said at least one rotatable holder, said at least one rotatable stabilizer being movable toward and away from said at least one rotatable holder, said at least one rotatable stabilizer adapted to stabilize the product on the at least one rotatable holder by applying a downward force onto a top of the product;
   a plurality of heating elements arranged in spaced relationship in a vertical array, said plurality of heating elements adapted to be directed to the product on said at least one rotatable holder so as to maintain the product at a constant temperature;
   at least one relief mold positioned on at least one of said plurality of heating elements, said at least one relief mold adapted to perform embossing on the product, said at least one relief mold being translatable horizontally relative to the vertical array of said plurality of heating elements;
   at least one sprayer positioned adjacent to the said at least one rotatable holder, said at least one sprayer adapted to apply color and patterns to the product, said at least one sprayer having a plurality of nozzles extending in a vertical array, and
   a plurality of color reservoirs connected to said at least one sprayer, said plurality of color reservoirs positioned adjacent to said at least one rotatable holder, said plurality of color reservoirs adapted to supply colors to said at least one sprayer.

2. The system of claim 1, wherein said plurality of heating elements comprise a plurality of air ducts, the plurality of air ducts adapted to allow hot air to pass therethrough and toward the product.

3. The system of claim 2, wherein said at least one relief mold is positioned on at least one of the plurality of air ducts.

4. The system of claim 1, wherein said plurality of color reservoirs are connected to the nozzle via a plurality of channels so as to transmit color or color mixtures to said at least one sprayer.

* * * * *